United States Patent
Xiao (10) Patent No.: US 11,146,172 B2
(45) Date of Patent: Oct. 12, 2021

(54) STARTUP/BROWNOUT ACTIVE CLAMPING FOR CAPACITOR-DROP POWER SUPPLY

(71) Applicant: TEXAS INSTRUMENTS INCORPORATED, Dallas, TX (US)

(72) Inventor: BoQiang Xiao, Tucson, AZ (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 277 days.

(21) Appl. No.: 16/507,370

(22) Filed: Jul. 10, 2019

(65) Prior Publication Data
US 2020/0059157 A1 Feb. 20, 2020

Related U.S. Application Data (60) Provisional application No. 62/719,200, filed on Aug. 17, 2018.

(51) Int. Cl.
*H02M 3/07* (2006.01)
*H02M 1/42* (2007.01)
*H02M 7/219* (2006.01)

(52) U.S. Cl.
CPC ............... *H02M 3/07* (2013.01); *H02M 1/42* (2013.01); *H02M 7/219* (2013.01); *H02M 1/4283* (2021.05)

(58) Field of Classification Search
CPC .......... H02M 3/07; H02M 1/42; H02M 7/219; H02M 1/4283; H02M 1/0045
See application file for complete search history.

(56) References Cited

U.S. PATENT DOCUMENTS

| | | | | |
|---|---|---|---|---|
| 6,373,790 B1* | 4/2002 | Fujisawa | ............... | H02M 7/219 368/204 |
| 6,756,838 B1* | 6/2004 | Wu | ........ | G11C 11/412 327/536 |
| 2014/0071722 A1* | 3/2014 | Gao | ........ | H02M 7/219 363/80 |
| 2017/0237339 A1* | 8/2017 | Young | .......... | H02M 7/4837 363/126 |
| 2018/0026518 A1* | 1/2018 | Liu | ........ | H02M 1/088 323/312 |
| 2018/0034302 A1* | 2/2018 | Van Den Berg | .... | H02J 7/00034 |

(Continued)

OTHER PUBLICATIONS

Xiao, BoQiang et al. "TPS7A78: A Self-Regulating Capacitor-Drop AC/DC Power Supply." Aug. 29, 2018, TI Technical Leadership Conference, pp. 1-22.

*Primary Examiner* — Rafael O De Leon Domenech
(74) *Attorney, Agent, or Firm* — Mark Allen Valetti; Charles A. Brill; Frank D. Cimino

(57) ABSTRACT

A circuit includes a rectifier, a charge pump, and a clamp control circuit. The rectifier has an input configured to be coupled to an alternating current (AC) power source. The rectifier rectifies an AC signal from the AC power source to produce a rectified voltage on a first voltage node. The rectifier includes a first transistor coupled to a ground node and to the input. The first switch has a first control input. The charge pump is coupled to the first voltage node. The charge pump is configured to generate a second voltage on a second voltage node. The voltage regulator is coupled to the second voltage node. The clamp control circuit is coupled to the first and second voltage nodes and has an output node coupled to the first control input.

21 Claims, 3 Drawing Sheets

(56) References Cited

U.S. PATENT DOCUMENTS

2019/0207513 A1     7/2019  Ramadass et al.
2019/0207532 A1     7/2019  Ramadass et al.
2020/0251913 A1*    8/2020  Zhou .................... H02J 7/00304
2020/0295587 A1*    9/2020  Giuliano ............ H02J 7/007182
2020/0382017 A1*   12/2020  Giuliano ............. H02M 1/4208

* cited by examiner

FIG. 5

STARTUP/BROWNOUT ACTIVE CLAMPING FOR CAPACITOR-DROP POWER SUPPLY

CROSS-REFERENCE TO RELATED APPLICATIONS

This application claims priority to U.S. Provisional Application No. 62/719,200, filed Aug. 17, 2018, which is hereby incorporated by reference.

BACKGROUND

A capacitor-drop power supply generates a supply voltage (e.g., a direct current (DC) voltage) to power a load. The supply voltage generated by a capacitor-drop power supply typically is lower than the mains alternating current (AC) voltage. A capacitor-drop power supply uses the reactance of a capacitor to deliver charge to the lower output supply voltage. Capacitor-drop power supplies are used, for example, in applications such as electricity meters (e-meters) and other low power systems.

SUMMARY

In one example, a circuit includes a rectifier, a charge pump, a linear voltage regulator, and a clamp control circuit. The rectifier has an input configured to be coupled to an alternating current (AC) power source. The rectifier rectifies an AC signal from the AC power source to produce a rectified voltage on a first voltage node. The rectifier includes at least a first transistor coupled to a ground node and to the input. The first switch has a first control input. The charge pump is coupled to the first voltage node. The charge pump is configured to generate a second voltage on a second voltage node. The voltage regulator is coupled to the second voltage node. The clamp control circuit is coupled to the first and second voltage nodes and has an output node coupled to the first control input.

BRIEF DESCRIPTION OF THE DRAWINGS

For a detailed description of various examples, reference will now be made to the accompanying drawings in which.

DETAILED DESCRIPTION

In one example, a capacitor-drop power supply includes a rectifier, a charge pump, and an output voltage regulator (e.g., a low drop-output (LDO) regulator). The charge pump is used to step down a rectified voltage from the rectifier for the output voltage regulator to regulate. The voltage regulator (e.g., LDO regulator) couples to the output of the charge pump, and generates an output regulated DC voltage to power a load. If the rectified voltage from the rectifier were to become too high, one or more components within the power supply (e.g., within the charge pump or clamp circuit) could be damaged. Accordingly, a Zener diode can be connected to the output from the rectifier to prevent the rectifier's output voltage from exceeding the breakdown voltage of the charge pump. Unfortunately, current through the Zener diode during normal operation of the power supply increases the total quiescent current of the power supply. Further, the Zener diode is typically external to the semiconductor package (chip) containing the rest of the components of the power supply, and the Zener diode thus occupies valuable board space.

In another example, a capacitor-drop power supply includes a rectifier, a clamp circuit, a charge pump, and an output voltage regulator. Instead of using a Zener diode to clamp the maximum permitted voltage of the output of the rectifier, the clamp circuit controls the rectifier circuit by controlling the on/off state of a pair of low side transistors within the rectifier. For example, when the input voltage to the charge pump reaches a threshold, the clamp circuit turns on the low side transistors to shunt current from the AC power source to ground. Such capacitor-drop power supplies may use the input voltage to the charge pump to power the clamp circuit. However, powering the clamp circuit with the input voltage to the charge pump means that a relatively high voltage (e.g., 20-24 V) is used to power the clamp circuit, and thus such a power supply is inefficient.

In accordance with another example, a capacitor-drop power supply uses the output voltage from the charge pump, which is at a lower magnitude than the charge pump's input voltage, to power an active clamp control circuit. Using a lower level voltage to power the active clamp control circuit reduces the quiescent current of the power supply making it operate more efficiently than if the higher voltage from the rectifier was used to power the active clamp control circuit. The active clamp control circuit in this example includes a bridge clamp monitor circuit that is powered by the output voltage generated by the charge pump. However, a capacitor is coupled between the output of the charge pump and ground. The capacitor serves as a decoupling capacitor for load transient steps on the LDO output. Depending on the size of the decoupling capacitor, the voltage from the charge pump to the voltage regulator may ramp up fairly slowly upon power-up of the power supply. Until LDO_IN is high enough to adequately power the bridge clamp monitor circuit, the bridge clamp monitor circuit is unable to control the low side transistors within the rectifier. Thus, while it is more efficient to power the active clamp control circuit with the charge pump's output voltage than the rectifier's output voltage, during initial power-on of the power supply, the active clamp control circuit may not be operative to shunt the AC power source to ground to prevent overcharge of the rectifier's output.

The disclosed active clamp circuit addresses this latter problem by including components, besides the bridge clamp monitor circuit, to turn on the low side transistors during a power-up event until the charge pump's output voltage is high enough to adequately power the bridge clamp monitor circuit. The additional components, which control the low side transistors while the bridge clamp monitor circuit's supply voltage rail is too low to power the bridge clamp monitor circuit (e.g., during a power-on event or during a brownout condition), generate a power-on reset (POR) signal based on the rectified voltage from the rectifier and a POR signal based on the output voltage from the charge pump. These additional components include logic gates that receive and use the POR signals to control the low side transistors.

Figure 1:
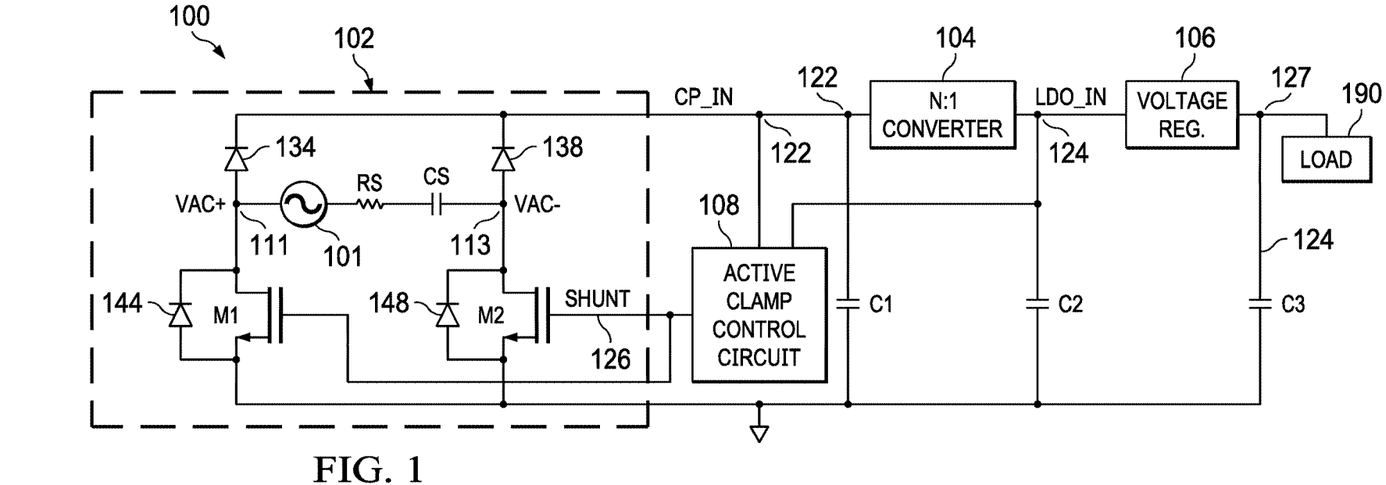
FIG. 1 illustrates an example of a power supply system.

FIG. 1 shows an illustrative circuit diagram of a capacitor-drop power supply 100. The example capacitor-drop power supply 100 includes a rectifier 102, an active clamp control circuit 108, an N:1 converter 104, and a voltage regulator 106. A load 190 is shown coupled to an output of the voltage regulator 106. The load is powered using the output voltage from the voltage regulator 106. In the example of FIG. 1, the rectifier 102 comprises transistors M1 and M2 and diodes 134 and 138. Transistors M1 and M2 are referred to as low side transistors. The body diodes of the transistors M1 and M2 also are shown including body diode 144 of transistor M1 and body diode 148 of transistor M2. Alternatively, diodes 144 and 148 also could be diodes separate from transistors M1 and M2. Transistors M1 and M2 in the example of FIG. 1 comprise n-type metal oxide semiconductor field effect transistors (NMOS transistors). Diodes 134 and 138 can be implemented as actual diodes or using the body diodes of transistors (e.g., p-type metal oxide semiconductor field effect transistors). The transistors can be implemented as different types of transistors in other implementations including, for example, NMOS transistors in place of PMOS transistors, PMOS transistors in place of NMOS transistors, bipolar junction transistors instead of the complementary metal oxide semiconductor field effect transistors (CMOS) shown. A transistor has a control input and current terminals. As a MOS transistor, the control input is the gate, and the current terminals are the source and drain. As a bipolar junction transistor, the control input is the base, and the current terminals are the emitter and collector.

The drain of transistor M1 is connected to the anode of diode 134 at node 111, and the drain of transistor M2 is connected to thee anode of diode 138 at node 113. An AC power source 101, series resistor RS and series capacitor CS are shown coupled between nodes 111 (VAC+) and 113 (VAC−). The sources of transistors M1 and M2 are connected together and to a ground node. The cathodes of diodes 134 and 138 are connected together at node 122. The voltage on node 122 is labeled CP_IN. The rectifier 102 rectifies the AC voltage from the AC power source 101 to produce a rectified voltage CP_IN on node 122.

In one example, the N:1 converter 104 comprises a charge pump, but can be implemented as other types of circuits in other examples. The N:1 converter 104 receives rectified voltage CP_IN and generates an output voltage LDO_IN, which is of a smaller magnitude than CP_IN. In one example, CP_IN is in the range of 16V to 24V, while LDO_IN is in the range of 4V to 6V. LDO_IN is provided to voltage regulator 106. In one example, voltage regulator 106 comprises an LDO regulator. The output voltage from voltage regulator 106 on node 127 is used to power the load 190. Capacitors C1, C2, and C3 couple between nodes 122, 124 and 127, respectively, and ground.

The active clamp control circuit 108 is coupled to nodes 122 and 124 and thus receives voltages CP_IN and LDO_IN. Active clamp control circuit 108 uses CP_IN and LDO_IN to generate SHUNT signal 126 to the gates of low side transistors M1 and M2 control their power states. During steady state operation (i.e., after a power-on event and the CP_IN and LDO_IN voltages have exceeded certain threshold levels indicative of normal system operation), the active clamp circuit 108 is powered by LDO_IN, and turns on transistors M1 and M2 responsive to LDO_IN or CP_IN exceeding an upper threshold level, above which components within the power supply could be damaged. Turning transistors M1 and M2 on causes current from the AC power source 101 to flow through the transistors M1, M2 to ground instead of onto node 122. CP_IN bleeds off during the phase of operation in which transistors M1 and M2 are shunted on. The active clamp control circuit 108 turns off transistors M1 and M2 in response to CP_IN dropping below a lower threshold level. With transistors M1 and M2 off, CP_IN charges up, and the process repeats. During steady state operation, the active clamp control circuit 108 is powered by LDO_IN, and controls the power state of transistors M1 and M2 based on a comparison of CP_IN to the upper and lower thresholds.

LDO_IN is of a lower magnitude than CP_IN. As noted above, CP_IN could be used to power the active clamp control circuit 108. However, using the lower voltage LDO_IN instead of the higher voltage CP_IN to power the active clamp control circuit 108, permits the capacitor-drop power supply 100 to operate more efficiently. During a power-on event in which AC power is initially supplied to the capacitor-drop power supply 100, voltages CP_IN and LDO_IN ramp up from 0V toward their steady state levels. The rate at which these voltages increase depends, at least in part, on the size of the capacitors C1 and C2 coupled between the corresponding nodes 122 and 124 and ground. The rate of change of CP_IN is inversely proportional to the capacitance of C1. Similarly, the rate of change of LDO_IN is inversely proportional to the capacitance of C2. In one example, C1 may be significantly smaller than C2. With C2 being larger than C1, LDO_IN will ramp up much slower than CP_IN during a power-on event. Because LDO_IN is to be used to power the active clamp control circuit 108, the active clamp control circuit 108 may not be able to rely on LDO_IN being high enough initially during a power-on event to adequately permit the active clamp control circuit 108 to control the on/off state of transistors M1 and M2. That is, a period of time may exist during a power-on event in which CP_IN has ramped up to its steady state level but LDO_IN is not yet at a sufficient level to power the active clamp control circuit 108.

Capacitors C1, C2, and C3 may be provided external to the semiconductor die containing the components of the rectifier 102, the N:1 converter 104, the voltage regulator 106, and the active clamp control circuit 108. A system integrator that provides the semiconductor die comprising rectifier 102, N:1 converter 104, voltage regulator 106, and active clamp control circuit 108 may choose any suitable value for capacitors C1 and C2. As such, a wide range of capacitance values are possible, and thus the active clamp control circuit 108 should operate to adequately control transistors M1 and M2 for any possible amount of time following the beginning of a power-on event before which LDO_IN reaches a sufficient level to adequately power the active clamp control circuit 108.

To address the possibility that LDO_IN does not reach a sufficient level quickly enough to be used to power the active clamp control circuit 108 to turn on and off transistors M1 and M2 responsive to the voltage level of CP_IN, the active clamp control circuit 108 controls the on/off state of transistors M1 and M2 in a different manner during a power-on event than that described above during steady state operation. The active clamp control circuit 108 includes one example circuitry to generate a CP_IN_POR signal and a LDO_IN_POR signal (shown in FIG. 2). The CP_IN_POR signal is asserted high by the circuitry responsive to CP_IN being larger than a respective threshold, and LDO_IN_POR signal is asserted high by the circuitry responsive to LDO_IN being larger than its respective threshold. These thresholds represent voltage levels above which CP_IN and LDO_IN are considered to be high enough for reliable use by any circuit operating from those voltage rails. Logic gates are included in the active clamp control circuit 108 to receive the CP_IN_POR and LDO_IN_POR signals and process those signals to generate the SHUNT signal 126 to the gates of transistors M1 and M2. Further explanation of this low side transistor control modality is provided below.

Figure 2:
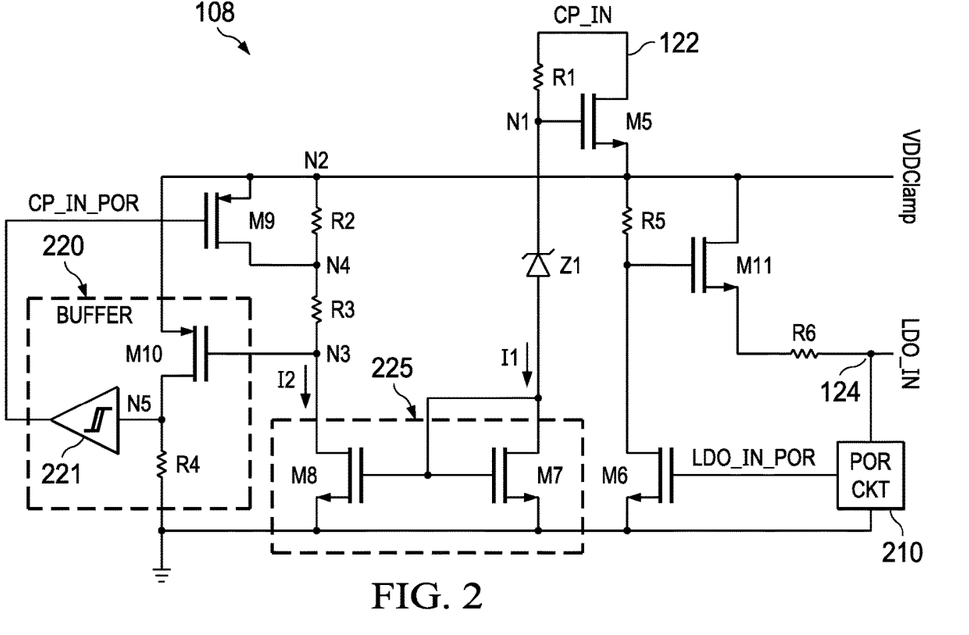
FIG. 2 shows a circuit comprising at least a portion of an active clamp control circuit usable in the power supply system of FIG. 1.

FIG. 2 shows an example of a portion of the circuitry comprising the active clamp control circuit 108. The circuitry in this example is coupled to node 122 (CP_IN) and to node 124 (LDO_IN). The example circuit includes transistors M5, M6, M7, M8, M9, and M11, resistors R1, R2, R3, R5, and R6, Zener diode Z1, POR circuit 210, and buffer 220. In this example, transistors M5-M8 and M11 are NMOS transistors, and transistor M9 and M10 are PMOS transistors, although transistors M5-M9 and M11 can be implemented with different transistor types. Resistor R1 connects between node 122 and the cathode of Zener diode Z1 at node N1. Node N1 also is connected to the gate of transistor M5. The drain of transistor M5 is connected to node 122. Resistor R5 is connected to the source of transistor M5 and to the drain of transistor M11 at node N2, the voltage of which is labeled VDDClamp. VDDClamp represents a sub-regulated rail having enough voltage regulation to adequately power the POR circuit 210 and other components shown in FIG. 2, and to help turn on and off transistors M1 and M2 before the LDO_IN is high enough to power the active clamp control circuit 108 during a power-on event. Resistor R5 is connected between node N2 and both the drain of transistor M6 and the gate transistor M11. The source of transistor M6 is connected to ground. Node 124 is connected to an input of POR circuit 210, and the output of POR circuit provides a signal labeled LDO_IN_POR to the gate of transistor M6. When LDO_IN_POR is logic low, transistor M6 is off, and when LDO_IN_POR is high, transistor M6 turns on. Resistor R6 is connected between the source of transistor M11 and node 124. Transistor M11 and resistor R6 are used to pre-charge node 124 (LDO_IN) before the N:1 converter 104 (which may comprise a charge pump) is able to begin switching.

The source of transistor M6 is connected to ground and its bulk connection. The anode of the Zener diode Z1 is connected to the drain of transistor M7 as well as to the gates of transistors M7 and M8. The sources of transistors M7 and M8 are connected to ground. Transistors M7 and M8 comprise a current mirror 225. The current I1 through transistor M7 is mirrored, per a current mirror ratio, as current I2 flowing through transistor M8. The current mirror ratio may be 1:1, or a ratio other than 1:1. Resistors R2 and R3 are connected in series between node N2 and the drain of transistor M8. The connection point between resistors R2 and R3 is designated node N4. Node N4 is connected to the drain of transistor M9. The output of the buffer 220 is connected to the gate of transistor M9. The source of transistor M9 is connected to node N2.

The buffer 220 comprises a Schmitt Trigger 221, transistor M10, and resistor R4. In this example, transistor M10 is a PMOS transistor. The source of transistor M10 is connected to node N2. The drain of transistor M10 is connected to resistor R4 at node N5. The opposing terminal of resistor R4 is connected to ground. The output signal of the Schmitt Trigger is CP_IN_POR, which is used to drive the gate of transistor M9. When CP_IN_POR is logic high, transistor M9 is off, and when CP_IN_POR is turned low, transistor M9 is turned on.

The POR circuit 210 is any suitable circuit that generates LDO_IN_POR responsive to LDO_IN being greater than a threshold indicative of LDO_IN being at a adequate level for all the circuitry to operate. POR circuit 210 asserts LDO_IN_POR logic high responsive to LDO_IN being greater than the threshold, and pulls LDO_IN_POR low when LDO_IN is lower than some hysteresis below the threshold.

Figure 3:
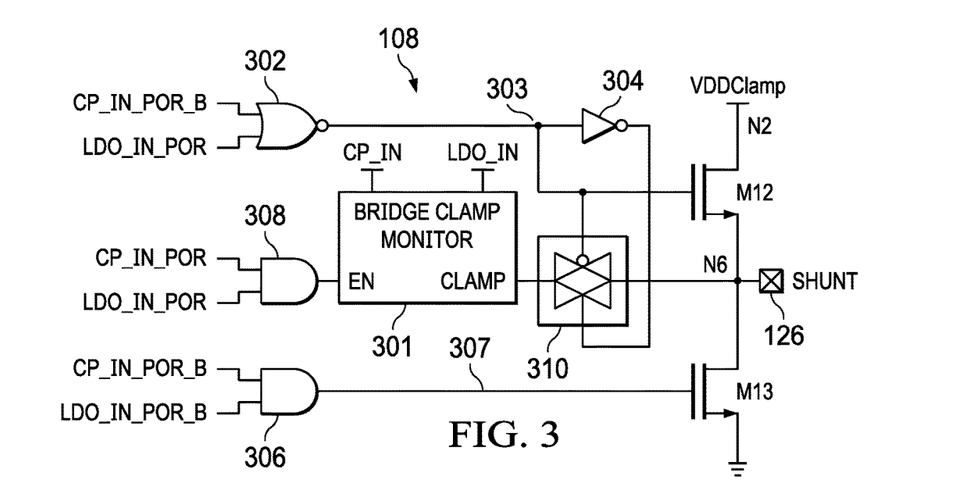
FIG. 3 shows another circuit usable with the circuit of FIG. 2 to control the on/off state of low side transistors within the power supply system of FIG. 1.

During a power-on event, CP_IN ramps up from 0 V. Initially, CP_IN is below the breakdown voltage of the Zener diode Z1. With no current I1 flowing through the Zener diode Z1, no voltage drop is present across resistor R1 and thus the gate voltage of transistor M5 (i.e., the voltage on node N1; VDDClamp) is equal to CP_IN. Transistor M5 will turn on responsive to CP_IN reaching the threshold voltage of transistor M5. As CP_IN continues to rise, eventually CP_IN will reach the breakdown voltage of the Zener diode Z1 (plus the threshold voltage of transistor M7). An example Zener diode breakdown voltage is 6 V and an example transistor threshold voltage is 1 V. With a Zener diode breakdown voltage of 6V and a threshold voltage for transistor M7, current I1 will begin to flow when CP_IN reaches 7 V. When transistor M5 turns on, the voltage on node N2 (VDDClamp) will be the voltage on node N1 minus the threshold voltage of transistor M5. Because the threshold voltages of transistors M5 and M7 are approximately the same, the VDDClamp voltage will be approximately equal to the breakdown voltage of the Zener diode Z1. The Zener diode Z1 functions to maintain VDDClamp at a controlled level approximately equal to the Zener diode's breakdown voltage even as CP_IN continues to rise. VDDClamp is used as shown in FIG. 3 (described below) as a crude regulated voltage sufficiently high to be used to turn on low side transistors M1 and M2. Responsive to CP_IN reaching the breakdown voltage of the Zener diode Z1 (plus the threshold voltage of transistor M7), current I1 begins to flow through resistor R1, Zener diode Z1, and transistor M7. Current I1 is then mirrored (per the applicable mirror ratio) through resistors R2 and R3 and transistor M8 as current I2.

While CP_IN is high enough to cause transistor M5 to be on thereby generating VDDClamp at approximately the Zener diode's breakdown voltage, current I2 begins to flow through transistor M8. The initial level of current I2 is low enough that the voltage on node N3 is high enough to prevent PMOS transistor M10 from turning on. Resistor R4 is a pull-down resistor on node N5, and thus the input signal to the Schmitt trigger 221 is low. As a result, CP_IN_POR is low. CP_IN_POR being low causes transistor M9 to be on, thereby shorting resistor R2.

As CP_IN continues to ramp up, CP_IN will reach a level at which the magnitude of I2 current flowing through resistor R3 will be large enough to cause the voltage on node N3 to be low enough to turn on transistor M10. The level at which CP_IN causes transistor M10 to turn on is set by the resistance of resistor R3. When transistor M10 turns on, the voltage on node N5 is pulled up to VDDClamp, and CP_IN_POR becomes logic high. CP_IN_POR being logic high causes transistor M9 to turn off. Resistor R2 implements hysteresis so that as CP_IN decreases, CP_IN_POR will transition from high to low as CP_IN falls below a lower voltage level than the low to high threshold. That is, CP_IN_POR transitions from low to high when CP_IN_POR exceeds a first threshold level, and CP_IN_POR transitions from high to low when CP_IN_POR falls below a second threshold level. The first threshold level is higher than the second threshold level.

The example circuit of FIG. 2 operates to generate LDO_IN_POR and CP_IN_POR. LDO_IN_POR is asserted high when LDO_IN reaches a threshold level indicative of LDO_IN being high enough to adequately operate circuitry powered from it. CP_IN_POR is similarly asserted high when CP_IN reaches a threshold level indicative of CP_IN being high enough to operate circuitry powered from it.

FIG. 3 shows an example of additional circuitry forming part of the active clamp control circuit 108. The circuit of FIG. 3 includes logic gates 302, 304, 306, and 308, bridge clamp monitor 301, switch 310, and transistors M12 and M13. In this example, transistors M12 and M13 are NMOS transistors, but can be implemented as different transistor types in other examples. The source of transistor M12 is connected to the drain of transistor M13 at node N6. The drain of transistor M12 is connected to node N2 (VDD-Clamp). The source of transistor M13 is connected to ground. The signal on node N6 is the SHUNT signal 126, which controls the on/off state of low side transistors M1 and M2 in FIG. 1. Responsive to transistor M13 being on (with transistor M12 off), the SHUNT signal 126 will be logic low, and transistors M1 and M2 will be off. Responsive to transistor M12 being on (with transistor M13 off), the SHUNT signal 126 will be pulled up to VDDClamp, and transistors M1 and M2 will be on.

In the example of FIG. 3, logic gate 302 comprises a NOR gate and is referred to herein as NOR gate 302. Logic gate 304 comprises an inverter and is referred to herein as inverter 304. Logic gates 306 and 308 comprise an AND gates and are referred to herein as AND gates 306 and 308, respectively. OR gate 302 has inputs that receive the signals LDO_IN_POR and CP_IN_POR_B. The trailing "B" in CP_IN_POR_B refers to "bar", which means the logical inverse of the signal. Thus, CP_IN_POR_B is the logical inverse of CP_IN_POR. The output 303 from NOR gate 302 is coupled to the gate of transistor M12, and thus controls the on/off state of transistor M12. AND gate 306 has inputs that receive the signals LDO_IN_POR_B (the logical inverse of LDO_IN_POR) and CP_IN_POR_B. The output 307 from AND gate 306 is coupled to the gate of transistor M13, and thus controls the on/off state of transistor M13.

AND gate 308 has inputs that receive the signals CP_IN_POR and LDO_IN_POR. The output of AND gate 308 is coupled to an enable (EN) input of the bridge clamp monitor 301. The output of AND gate 308 thus enables or disables the bridge clamp monitor 301. The bridge clamp monitor 301 is powered via LDO_IN as shown. Switch 310 is controlled using the output 303 of NOR gate 302, and its logical inverse via inverter 304 thereby forming a different control signal. When switch 310 is closed, the CLAMP output of bridge clamp monitor 301 controls the voltage on node N6, and thus controls the SHUNT signal 126. When switch 310 is open, the bridge clamp monitor 301 does not control the voltage on node N6 (SHUNT signal 126).

During a power-on event, LDO_IN will rise to its steady state level. While LDO_IN is too low to adequately power the bridge clamp monitor 301, either LDO_IN_POR or CP_IN_POR will be low. With either or both CP_IN_POR and LDO_IN_POR being low, the output of AND gate 308 will be low, thereby disabling the bridge clamp monitor 301, which otherwise either needs not be on, or will not operate reliably or accurately due to LDO_IN being too low for the bridge clamp monitor's operation. Instead of the bridge clamp monitor 301 controlling the SHUNT signal 126 during this initial phase of the power-on process, logic gates 302, 304 and 306 are used to control the on/off state of transistors M12 and M13 to thereby control the SHUNT signal 126.

The output 303 of NOR gate 302 is logic low when either or both of its inputs CP_IN_POR_B and LDO_IN_POR are logic high; otherwise the output of NOR gate 302 is logic high (that is, when both inputs are logic low). With LDO_IN_POR being low, the output 303 of NOR gate 302 will be logic high when CP_IN_POR_B is low (and CP_IN_POR is high). The output 303 of NOR gate 302 will be logic low when CP_IN_POR_B is high (and CP_IN_POR is low). As such, when CP_IN_POR is low, the output 303 from NOR gate 302 will be low, and as a result, transistor M12 will be off. When CP_IN_POR is high (which could mean CP_IN is too high and transistors M1 and M2 should be turned on), the output 303 of NOR gate 302 will be logic high, thereby turning on transistor M12. With transistor M12 turned on, the SHUNT signal 126 will be pulled high (e.g., to the level of the VDDClamp voltage), thereby turning on low side transistors M1 and M2 in FIG. 1.

The output 307 of AND gate is logic high only when both its inputs CP_IN_POR_B and LDO_IN_POR_B are high; otherwise output 307 is low. During a power-on event with LDO_IN slowly ramping up and not having reached a high enough level to trigger LDO_IN_POR to be asserted high, LDO_IN_POR will be low and thus LDO_IN_POR_B will be high. As such, the output 307 of AND gate 306 will have the same logic state as CP_IN_POR_B (and thus the opposite logic state as CP_IN_POR).

As such, when CP_IN_POR is low, transistor M12 turned off as explained above, and transistor M13 is turned on due to the output 307 of AND gate 306 being high. When CP_IN_POR is high, transistor M13 is turned off and transistor M12 is turned on. As such, transistors M12 and M13 are controlled during the power-on event (with LDO_IN_POR being low) based on the logical state of CP_IN_POR. By controlling the on/off state of transistors M12 and M13, the SHUNT signal 126 also is controlled during this phase of the power-on event, while bridge clamp monitor 301 is disabled.

Once LDO_IN reaches a sufficiently high level to thereby force LDO_IN_POR high, the output 303 of NOR gate 302 will be logic low preventing transistor M12 from turning on, and the output 307 of AND gate 306 also will be logic low preventing transistor M13 from turning on. Instead, switch 310 is turned on to pass through the CLAMP control signal from the bridge clamp monitor 301 to node N6 as the SHUNT signal 126. Further, with LDO_IN_POR and CP_IN_POR being high, the output of AND gate 308 will be high thereby enabling the bridge clamp monitor 301. With the bridge clamp monitor 301 enabled and powered by LDO_IN, the SHUNT signal 126 will be controlled by the bridge clamp monitor's CLAMP output. Table I below summarizes the above-described behavior of the circuit of FIGS. 1 and 3 based on different combinations of logic states of CP_IN_POR and LDO_IN_POR.

TABLE I

| CPI_IN_POR | LDO_IN_POR | CAUSE | ACTION |
|---|---|---|---|
| 0 | 0 | Nothing powered up | Bridge clamp monitor 301 disabled, and shunt signal 126 controlled off based on CP_IN_POR = 0 |

TABLE I-continued

| CPI_IN_POR | LDO_IN_POR | CAUSE | ACTION |
|---|---|---|---|
| 0 | 1 | CP_IN is high enough to charge LDO_IN sufficiently to trigger LDO_IN_POR to be asserted high | Bridge clamp monitor 301 disabled, and low side transistors M1 and M2 off |
| 1 | 0 | CP_IN has charged, but LDO_IN still low due to large C2; or LDO_IN shorted to ground | Bridge clamp monitor 301 disabled, and shunt signal 126 controlled on based on CP_IN_POR = 1 |
| 1 | 1 | CP_IN and LDO_IN both sufficiently high to power bridge clamp monitor 301 via LDO_IN | Bridge clamp monitor 301 enabled to control M1 and M2. |

In FIG. 3, the bridge clamp monitor 301 is powered by LDO_IN, while the logic gates 302, 3040, 306, and 308 are powered by VDDClamp, which itself is derived from CP_IN as explained above. The supply voltage to the drain of transistor M12 also is VDDCLamp. The logic gates 302-308 and the transistors M12 and M13 thus pull current directly off of CP_IN, and such current is kept to a relatively low level for efficiency reasons.

Figure 4:
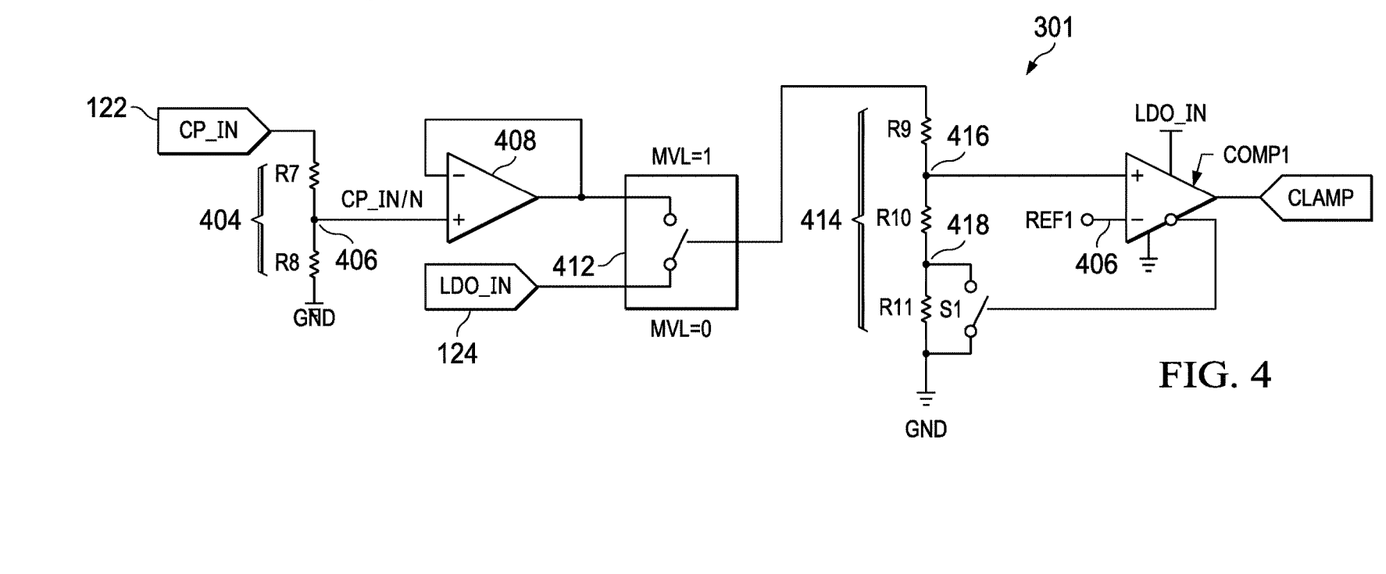
FIG. 4 shows an example circuit of a bridge clamp monitor usable in the circuit o FIG. 3.

FIG. 4 shows an example implementation of bridge clamp monitor 301. In this example, bridge clamp monitor 301 includes a voltage reference 406, resistors R7-R11, comparator COMP1, an operational amplifier 408 configured for unity gain, a multiplexer 412, and a switch S1. Comparator COMP1 is powered by LDO_IN. As shown, CP_IN is provided to resistor R7, and resistors R7 and R8 are connected in series between CP_IN and ground. Resistors R7 and R8 are selected such that a node 406 between R7 and R8 is set to CP_IN/N (the resistance value of R1 is N times the resistance value of R2). This value of N is the same as the ratio for the N:1 converter 104. In the example of FIG. 2, the node 206 is coupled to the unity gain operational amplifier 408. The output of the operational amplifier 408 is CP_IN/N. Multiplexer 412 provides either the output of the operational amplifier 408 (CP_IN/N) or LDO_IN. In some examples, the control signal for the multiplexer 412 is MVL. In one example, MVL is set by a voltage monitor that compares LDO_IN to a threshold. For example, if LDO_IN is above an upper threshold, then MVL is set to a logical "1". On the other hand, if LDO_IN is below a lower threshold, then MVL is set to a logical "0". In some examples, when MVL equals 1, CP_IN/N is output from the multiplexer 412 to a second voltage divider 414 comprising resistors R9 and R10. Otherwise, when MVL equals 0, the multiplexer 412 provides LDO_IN to the second voltage divider 414.

Voltage divider 414 includes a node 416 between R9 and R10, where the voltage level at node 416 is a function of R9 and R10. The voltage level at the node 416 is input to comparator COMP1. In the example of FIG. 4, the voltage divider 414 includes R11, which is selectively bypassed using a switch, S1. In some examples, the control signal for S1 is the inverse of the output from the comparator COMP1. In the example of FIG. 4, R11 is used to set the hysteresis of the comparator (e.g., ~100 mV), and R9 and R10 are used to set the clamp trip points depending on LDO_OUT, REF1 406, and the drop-out voltage of voltage regulator 106 (VDROP_OUT). In some examples, R9=0.8 of the total resistance (R9+R10+R11), R10=0.18 of the total resistance, and R11=0.02 of the total resistance. In one example, REF1 is the bandgap (1.2V), VDROP_OUT is 0.6V, and LDO_OUT is 3.3V or 5V. In other examples, the values for LDO_OUT, VDROP_OUT, and REF1 vary. The output of the comparator COMP1 is the CLAMP output (FIG. 3).

Figure 5:
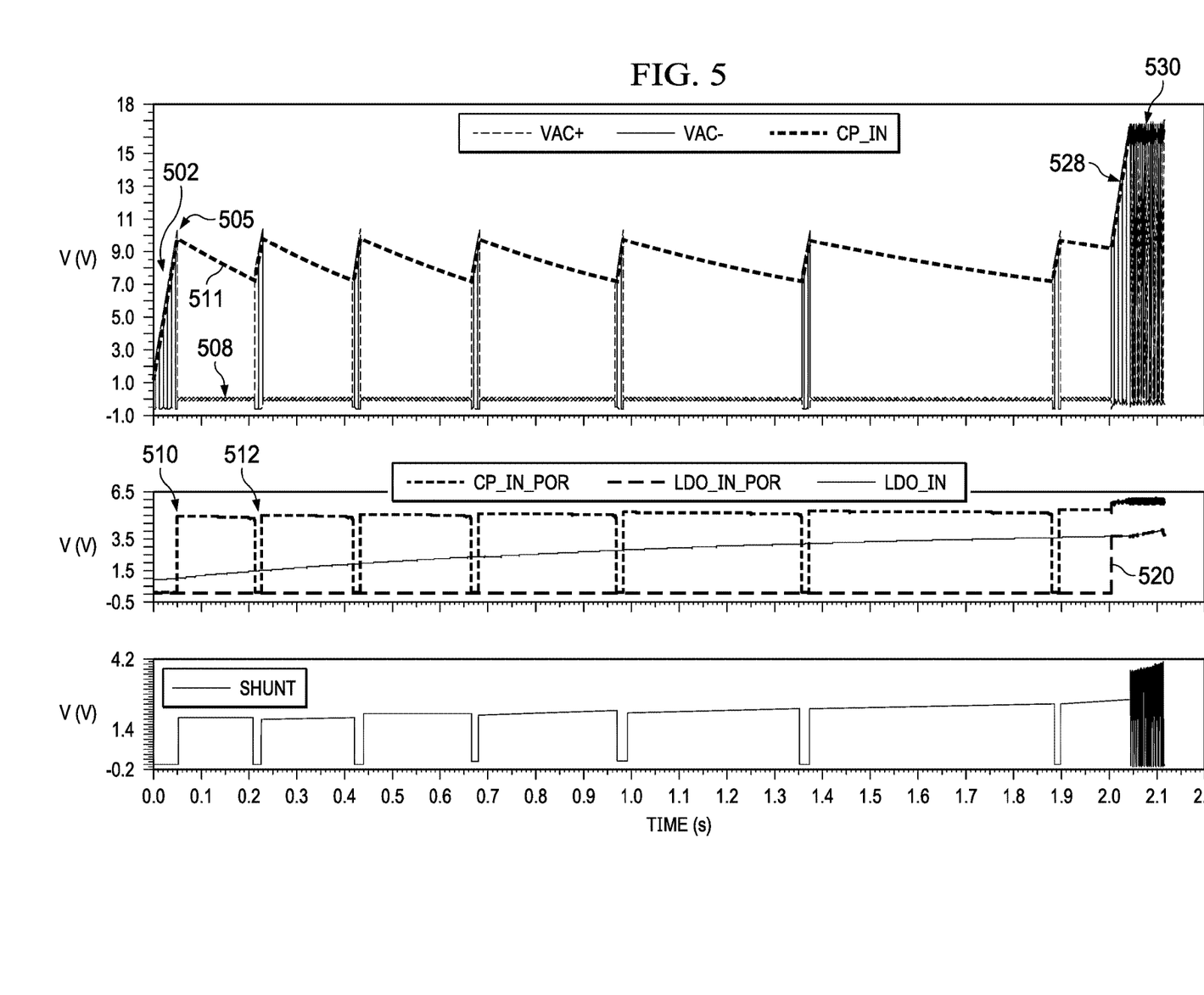
FIG. 5 illustrates a timing diagram for the power supply system of FIG. 1.

FIG. 5 shows an example timing diagram illustrating the behavior of the circuits discussed above. The signals shown in FIG. 5 include VAC+, VAC-, CP_IN, LDO_IN, LDO_IN_POR, CP_IN_POR, and SHUNT 126. The AC power source is activated to the capacitor-drop power supply 100 at time 0. Once the power-on event starts, LDO_IN begins to ramp up slowly as shown over the course of, in this example, about 2 seconds. LDO_IN remains low enough until about the 2 second mark that LDO_IN_POR is low. When LDO_IN_POR reaches a pre-configured threshold (with the POR circuit 210, FIG. 2), LDO_IN_POR is then asserted high as shown at 520. Prior to that point in time, the shunt control is handled through the control of transistors M12 and M13 and the CP_IN_POR and LDO_IN_POR signals as shown in FIG. 3. The VAC+/- are shunted to ground and released based on the CP_IN_POR high and low thresholds.

CP_IN is shown in FIG. 5 to ramp up much more quickly than LDO_IN because the capacitance of C1 on node 122 (FIG. 1) is smaller than the capacitance of C2 on node 124. At 502, the VAC+ and VAC- voltages oscillate reciprocally at the frequency of the AC power source 101 (e.g., 50 Hz, 60 Hz, etc.). CP_IN is not high enough at 502 (and thus CP_IN_POR is low) to warrant needing to turn on the low side transistors M1 and M2. Responsive to CP_IN reaching a high enough level to cause CP_IN_POR to transition to a logic high state at 510, transistor M12 (FIG. 3) is turned on thereby forcing SHUNT high and turning on the low side transistors M1 and M2 and shunting current from the AC power source 101 to ground instead of continuing charge node 122 (CP_IN). As a result, CP_IN ramps downward as shown at 511. During the time that the low side transistors M1 and M2 are on, the VAC+ and VAC- voltages are low as shown at 508. When CP_IN eventually falls low enough to cause CP_IN_POR to become logic low at 512, transistor M13 is turned on forcing SHUNT low to thereby turn off the low side transistors M1 and M2. With transistors M1 and M2 off, CP_IN again ramps up.

This process repeats until eventually LDO_IN is high enough to power the bridge clamp monitor 301. At this point, LDO_IN_POR is asserted high at 520 at which time the SHUNT signal (and thus the low side transistors M1 and M2) is controlled by the bridge clamp monitor 301. When LDO_IN_POR and CP_IN_POR are both high at 520, the bridge clamp monitor 301 is enabled to control the SHUNT signal 126 from this point forward. The target trip thresholds of the bridge clamp monitor 301 are more accurate and set higher than the CP_IN_POR thresholds, allowing CP_IN to charge up further to the thresholds set by the bridge clamp monitor 301. CP_IN ramps up at 528 and toggles between higher voltage levels at 530 in the steady state.

In this description, the term "couple" or "couples" means either an indirect or direct connection. Thus, if a first device couples to a second device, that connection may be through a direct connection or through an indirect connection via other devices and connections. Modifications are possible in the described embodiments, and other embodiments are possible, within the scope of the claims.

What is claimed is:

1. A system, comprising:
    a capacitor-drop power supply including:
        a rectifier having an input configured to be coupled to an alternating current (AC) power source, the rectifier configured to rectify an AC signal from the AC power source to produce a rectified voltage on a first voltage node, the rectifier including a first transistor coupled to a ground node and to the input;
        an N:1 converter coupled to the first voltage node, the N:1 converter configured to generate a second voltage on a second voltage node;
        a voltage regulator coupled to the second voltage node, the voltage regulator having an output voltage node; and
        a clamp control circuit coupled to the first and second voltage nodes, the clamp control circuit configured to:
            when at least one of the rectified voltage is less than a first threshold voltage, or the second voltage is less than a second threshold, control the on/off state of the first transistor based on both the rectified and second voltages; and
    a load coupled to the output voltage node.

2. The system of claim 1, wherein the clamp control circuit is configured to, when both of the rectified and second voltages are greater than their respective threshold voltages, control the on/off state of the first transistor based on the rectified or second voltages, and use the second voltage to power the clamp control circuit.

3. The system of claim 1, wherein the N:1 converter comprises a charge pump.

4. The system of claim 1, wherein the clamp control circuit comprises:
    a second transistor having a first control input and first and second current terminals, the first current terminal is configured to receive a voltage derived from the first voltage node;
    a third transistor having a second control input and third and fourth current terminals, the third current terminal coupled to the second current terminal at a signal node, and the fourth current terminal coupled to a ground node; and
    a bridge clamp monitor having a power input coupled to the second voltage node, and having a clamp output coupled to the signal node;
    wherein the clamp output is coupled to the signal node.

5. The system of claim 4, wherein the clamp control circuit comprises:
    a first circuit configured to generate a first power-on reset (POR) signal responsive to the rectified voltage exceeding the first threshold; and
    a second circuit configured to generate a second power-on reset (POR) signal responsive to the second voltage exceeding the second threshold.

6. The system of claim 5, wherein the clamp control circuit is configured to control the first control input based on a signal from a first logic gate, the first logic configured to logically combine the first and second POR signals, and to control the second control input based on a signal from a second logic gate, the second logic gate configured to logically combine the first and second POR signals.

7. The system of claim 6, wherein the bridge clamp monitor has an enable input, and the system further comprises a third logic gate having an output coupled to the enable input, the first logic including inputs configured to receive to the first and second POR signals.

8. The system of claim 7, wherein the first, second, and third logic gates are configured to be powered with the voltage derived from the first voltage node.

9. A circuit, comprising:
    a first transistor having a first control input and first and second current terminals;
    a second transistor having a second control input and third and fourth current terminals, the third current terminal coupled to the second current terminal;
    a first logic gate having an output coupled to the first control input;
    a second logic gate having an output coupled to the second control input; and
    a bridge clamp monitor having an enable input, a power supply input, and a clamp output, the clamp output coupled to the second and third current terminals, and the power supply input coupled to a first supply voltage node;
    wherein, responsive to a voltage on the first supply voltage node being less than a first threshold, the enable input receives a signal to disable the bridge clamp monitor, and the first and second gates control the first and second control inputs, respectively, based on a first power-on reset signal indicative of whether the voltage on the first supply voltage node is less than the first threshold, and based on a second power-on reset signal indicative of whether a voltage on a second voltage node is less than a second threshold.

10. The circuit of claim 9, further comprising a third logic gate, wherein responsive to the first voltage being greater than the first threshold and the second voltage being greater than the second threshold, the third logic gate is configured to assert a signal to the enable input to enable the bridge claim monitor.

11. The circuit of claim 10, wherein responsive to the first voltage being greater than the first threshold and the second voltage being greater than the second threshold, the first logic gate is configured to assert a signal to the first transistor to cause the first transistor to be off, and the second logic gate is configured to assert a signal to the second transistor to cause the second transistor to be off.

12. The circuit of claim 9, wherein the first current terminal is coupled to a voltage node configured to have a voltage derived from a voltage on the second supply voltage node.

13. The circuit of claim 9, further comprising a Zener diode, and wherein the first current terminal is coupled to a third transistor having a third control input coupled to the Zener diode.

14. The circuit of claim 13, wherein the Zener diode is configured to use the voltage on the first supply voltage node to generate a voltage usable to generate the first and second POR signals.

15. The circuit of claim 9, further comprising a circuit configured to use the voltage on the first supply voltage node to generate a voltage usable to generate the first and second POR signals.

16. A system, comprising:
a rectifier having an input configured to be coupled to an alternating current (AC) power source, the rectifier configured to rectify an AC signal from the AC power source to produce a rectified voltage on a first voltage node, the rectifier including a first transistor coupled to a ground node and to the input;
an N:1 converter coupled to the first voltage node, the N:1 converter configured to generate a second voltage on a second voltage node; and
a clamp control circuit coupled to the first and second voltage nodes, the clamp control circuit configured to, when at least one of the rectified voltage is less than a first threshold voltage, or the second voltage is less than a second threshold, control the on/off state of the first transistor based on both the rectified and second voltages.

17. The system of claim 16, wherein the clamp control circuit is configured to, when both of the rectified and second voltages are greater than their respective threshold voltages, control the on/off state of the first transistor based on the rectified or second voltages, and use the second voltage to power the clamp control circuit.

18. The system of claim 16, wherein the clamp control circuit comprises:
a second transistor having a first control input and first and second current terminals, the first current terminal coupled to the first voltage node;
a third transistor having a second control input and third and fourth current terminals, the third current terminal coupled to the second current terminal at a signal node, and the fourth current terminal coupled to a ground node;
a bridge clamp monitor having a power input coupled to the second voltage node, and having a clamp output coupled to the signal node.
wherein the clamp output is coupled to the signal node.

19. The system of claim 18, wherein the clamp control circuit comprises:
a first circuit configured to generate a first power-on reset (POR) signal responsive to the rectified voltage exceeding the first threshold; and
a second circuit configured to generate a second power-on reset (POR) signal responsive to the second voltage exceeding the second threshold.

20. The system of claim 19, wherein the clamp control circuit is configured to control the first control input based on a first logical combination of the first and second POR signals, and to control the second control input based on a second logical combination of the first and second POR signals.

21. The system of claim 20, wherein the bridge clamp monitor has an enable input, and the system further comprises a first logic gate having an output coupled to the enable input, the first logic including inputs configured to receive to the first and second POR signals.

* * * * *